(12) United States Patent
Kim

(10) Patent No.: US 6,967,701 B1
(45) Date of Patent: Nov. 22, 2005

(54) LIQUID CRYSTAL DISPLAY DEVICE WITH BLACK FILM AND METHOD OF FABRICATING THE SAME

(75) Inventor: Kyoung Sub Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/394,379

(22) Filed: Sep. 10, 1999

(30) Foreign Application Priority Data

Sep. 19, 1998 (KR) .................................. P98-38841

(51) Int. Cl.⁷ ..................... G02F 1/1333; G02F 1/1335
(52) U.S. Cl. ........................ 349/122; 349/61; 349/110
(58) Field of Search ........................... 349/61, 122, 62, 349/65, 110; 362/31, 26

(56) References Cited

U.S. PATENT DOCUMENTS

| | | | | |
|---|---|---|---|---|
| 4,805,995 A | * | 2/1989 | Torigoe | 350/339 R |
| 5,739,880 A | * | 4/1998 | Suzuki et al. | 349/110 |
| 5,870,160 A | * | 2/1999 | Yanagawa et al. | 349/141 |
| 5,966,191 A | * | 10/1999 | Lee | 349/58 |
| 6,053,619 A | * | 4/2000 | Nakamura et al. | 362/31 |
| 6,137,560 A | * | 10/2000 | Utsumi et al. | 349/181 |
| 6,147,724 A | * | 11/2000 | Yoshii et al. | 349/62 |
| 6,191,833 B1 | * | 2/2001 | Hirakata | 349/61 |
| 6,313,891 B1 | * | 11/2001 | Nagakubo et al. | 349/65 |
| 6,504,589 B1 | * | 1/2003 | Kashima et al. | 349/96 |

FOREIGN PATENT DOCUMENTS

| | | |
|---|---|---|
| JP | 63287821 | 11/1988 |
| JP | 5264955 | 10/1993 |

* cited by examiner

Primary Examiner—Kenneth Parker
Assistant Examiner—Mike Qi
(74) Attorney, Agent, or Firm—McKenna Long & Aldridge LLP

(57) ABSTRACT

A liquid crystal display device with a black film for reducing bright lines, light leakage and line cloak. The liquid crystal display device has a liquid crystal panel divided into a display portion and a non-display portion. Black film is formed on the under surface of the non-display portion in the liquid crystal panel. By utilization of black film for reducing bright lines, light leakage and line cloak, the picture quality of the liquid crystal display device is greatly enhanced and the liquid crystal display device is lighter and slimmer.

26 Claims, 4 Drawing Sheets

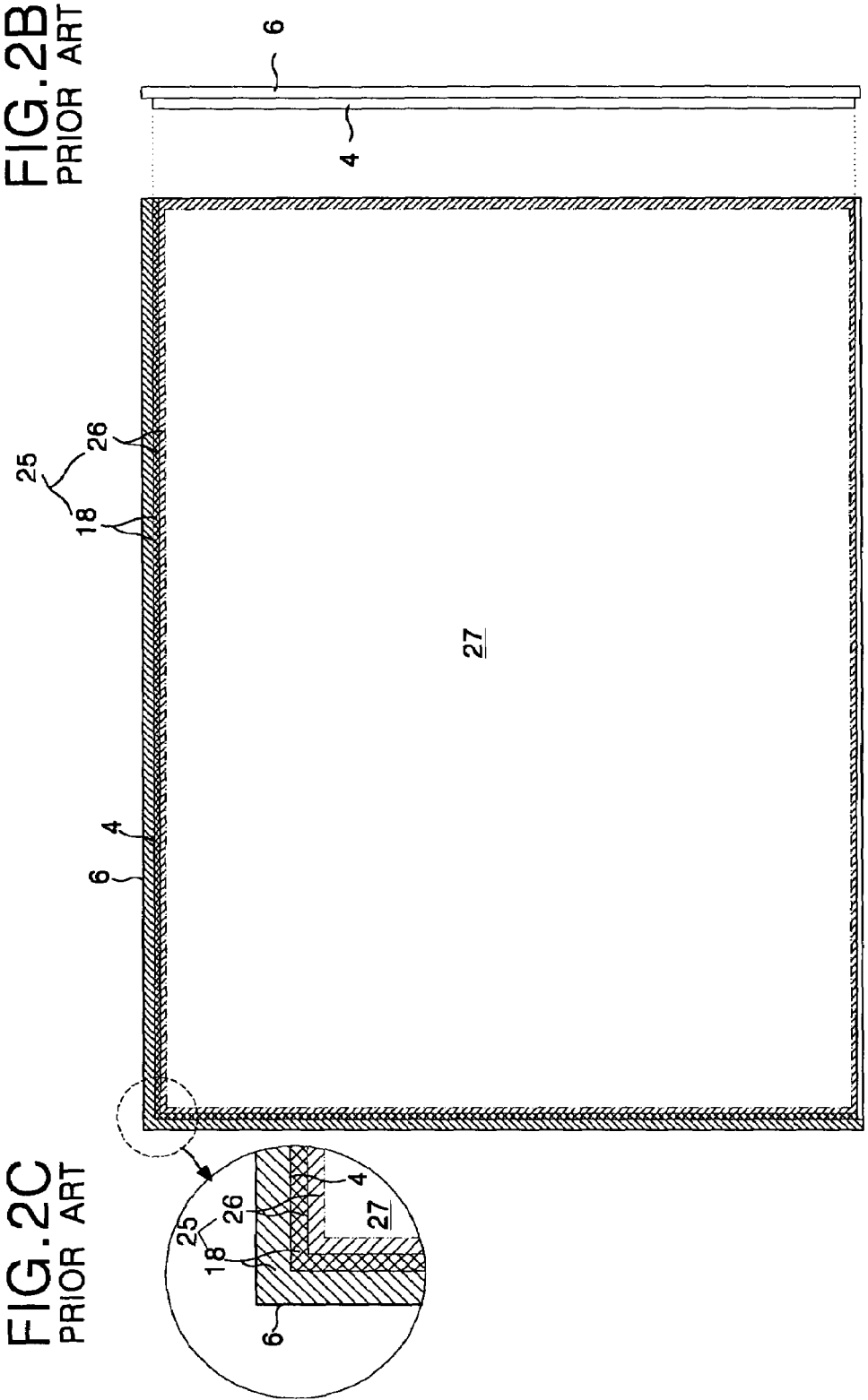

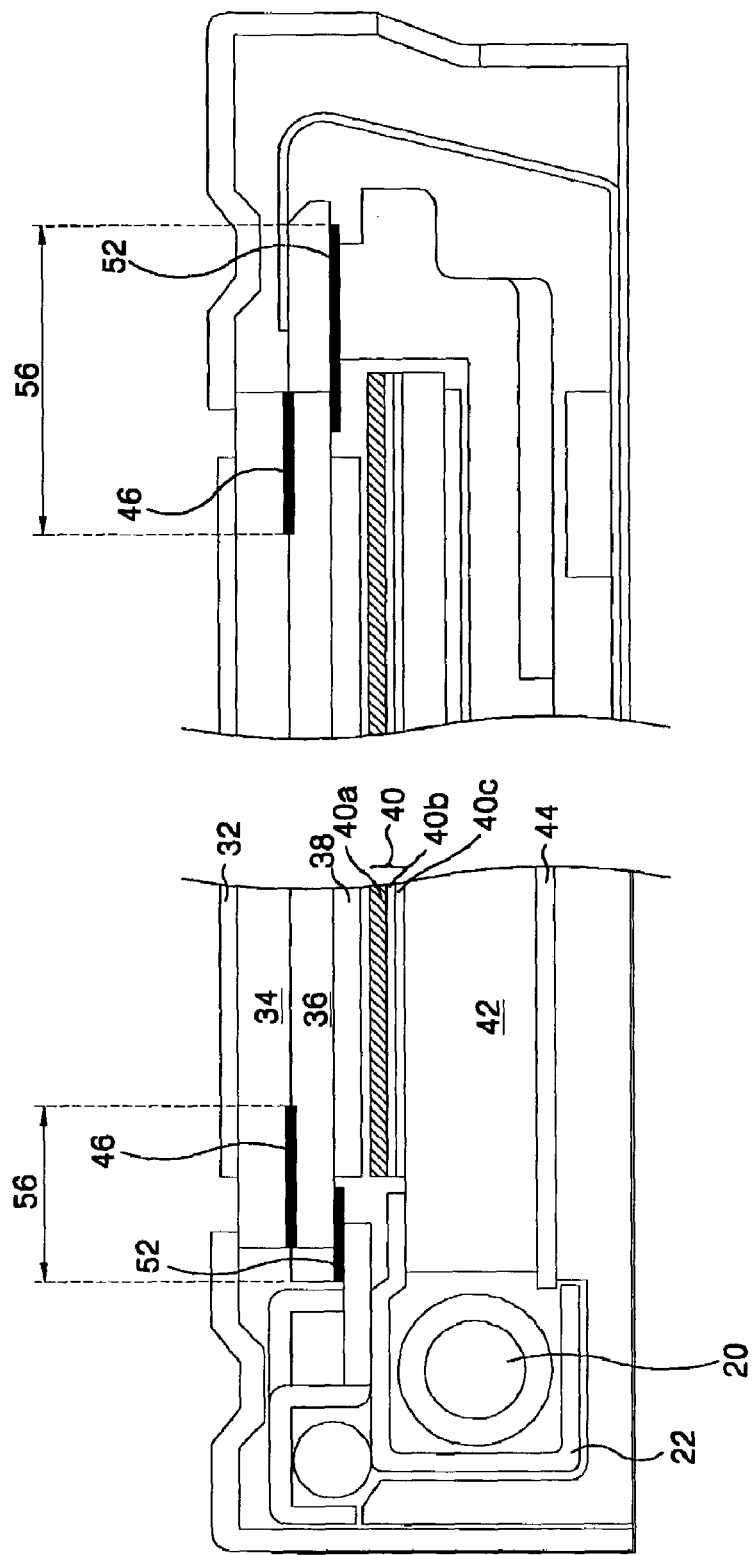

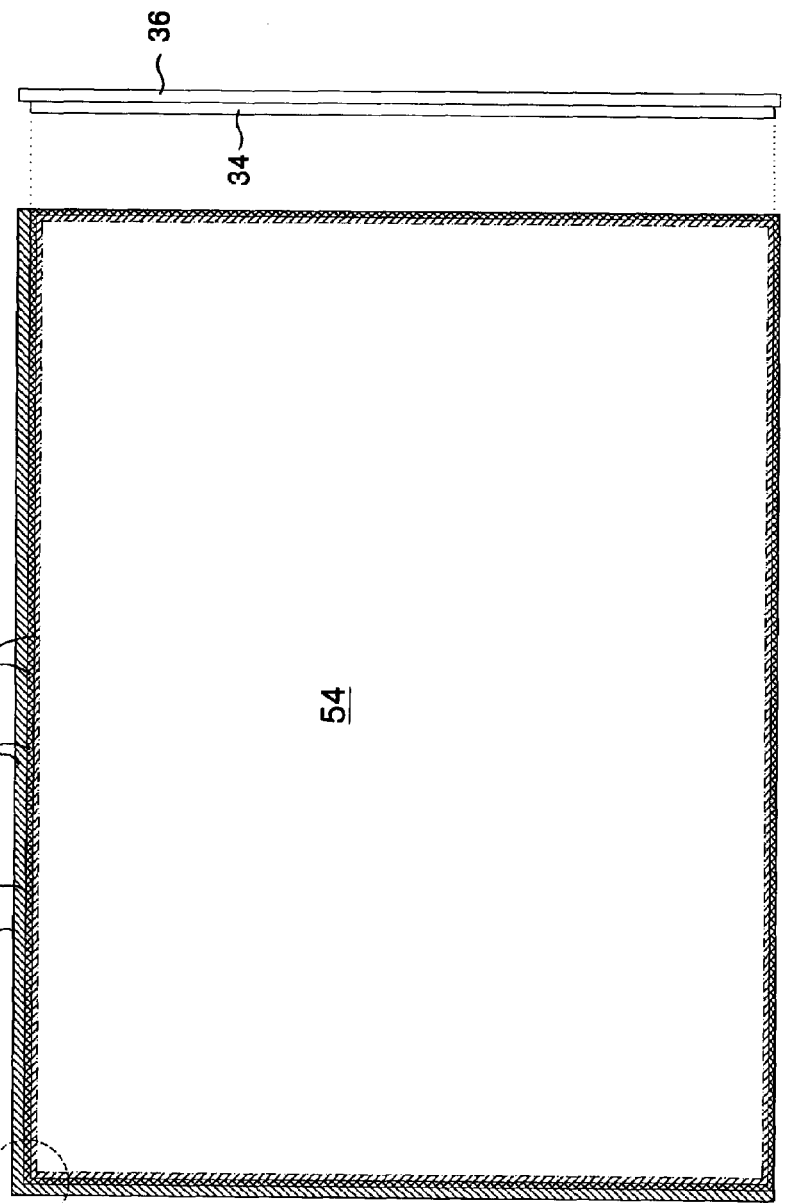
FIG. 4A
FIG. 4B
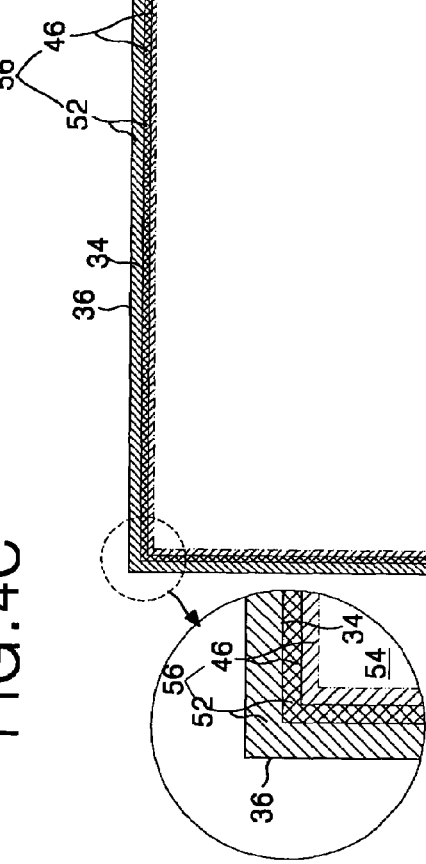
FIG. 4C

LIQUID CRYSTAL DISPLAY DEVICE WITH BLACK FILM AND METHOD OF FABRICATING THE SAME

This application claims the benefit of Korean Patent Application No. P98-38841, filed on Sep. 19, 1998, which is hereby incorporated by reference.

BACKGROUND OF THE INVENTION

1. Field of the Invention

This invention relates to a liquid crystal display device and, more particularly, to a liquid crystal display device with a black film which is implemented in such a manner that a liquid crystal display device reduces bright lines, light leakage and line cloak and also to a method of fabricating the same.

2. Description of the Prior Art

Recently, a liquid crystal display device has desirable features, such as a light and slim body, a low power drive, and so on. Also, the liquid crystal display device has a greatly enhanced picture quality due to improvement of the liquid crystal material and development of the processing technique of the fine pixel (or picture element). The application of the liquid crystal display device is gradually extended to devices other than computers. The liquid crystal display device is composed of a liquid crystal panel and a driving circuit for driving the liquid crystal panel. The liquid crystal panel generally includes liquid crystal cells arranged between two glass substrates (i.e., a upper glass substrate and a lower glass substrate) in the matrix formation and switching elements, such as a TFT (thin film transistors) array, for switching each of the signals supplied to the liquid crystal cells. In order to drive the liquid crystal panel, the driving circuit applies a control signal, a video signal and so on to the liquid crystal panel.

Referring to FIG. 1, a prior liquid crystal display device consists of a liquid crystal display module for displaying a picture corresponding to the video signal. The liquid crystal display module includes a sheet material 10 for directing a light beam from a back-light guide 12 in the vertical direction, a lower polarizing plate 8 for polarizing the light beam through the sheet material 10, a lower glass substrate 6 fabricated with switch elements, an upper glass substrate 4 disposed on the lower glass substrate 6 to form a liquid crystal layer, and an upper polarizing plate 2 for polarizing the lights from the upper glass substrate 4.

In the liquid crystal display module, the switch elements of the liquid crystal panel are driven according to the control and video signals from drive integrated circuits connected with a PCB (printed circuit board) to vary the arranged state of the liquid crystal. The amount of light passing through the liquid crystal panel is controlled on the basis of the arranged state of the liquid crystal so that the picture corresponding to the video signal is displayed. On the other hand, the back-light unit, used as a light source of the liquid crystal display module, consists of a lamp 20, a lamp housing 22, a light guide 12 and a reflective sheet 14. The light beam generated in the lamp 20 proceeds toward the light guide 12, and the light beam is guided to the liquid crystal display module by the light guide 12. The lamp housing 22 surrounds the lamp 20 to reflect the light beam generated in the lamp 20 to the light guide 12. The reflective sheet 14 installed on the lower and side surfaces of the light guide 12 also reflects the lights from the lower and side surfaces of the light guide 12 to the liquid crystal display module.

The liquid crystal panel is divided into a display area 27 and a non-display area 25, as shown in FIGS. 2A–2C. The display area 27 substantially transmits the light to display the picture. The picture is not displayed in the non-display area 25. A black matrix 26 is created on the part of the non-display area 25. Since the lower glass substrate 6 of the liquid crystal panel is formed larger than the upper glass substrate 4, light leakage, bright lines, line cloak and other undesirable characteristics appear on the remaining portion which the black matrix 26 does not cover. Light leakage and bright lines are caused by light leaking out from the back-light unit in the remaining portion. Line cloak is generated by covering the line in accordance with a visual angle.

In order to prevent bright lines, light leakage and line cloak, a protective sheet 10a is provided on the liquid crystal panel. In particular, the sheet material 10 is provided with a diffusion sheet 10c for diffusing the light guided by the back-light unit, a prism sheet 10b for concentrating the light diffused by the diffusion sheet 10c to each of the liquid crystal cells on the liquid crystal panel, and the protective sheet 10a for protecting the prism sheet 10b. These diffusion, prism and protective sheets 10a through 10c are sequentially disposed on the back-light unit to transmit the light from the back-light unit to the liquid crystal panel. The protective sheet 10c is fabricated larger than the liquid crystal panel to prevent bright lines, light leakage and line cloak on the liquid crystal display device.

A silicone pad 18 is attached on one end of the protective sheet 10c, such as, on the right edge of the protective sheet 10c. Also, a black pattern 24 is printed on the other end of the protective sheet 10c, i.e., on the left edge of the protective sheet 10c. In detail, the silicone pad 18 attached on one end of the protective sheet 10c, as shown in FIG. 1, prevents bright lines, light leakage and line cloak. The black pattern 24 printed on the other end of the protective sheet 10c also prevents bright lines, light leakage and line cloak. Furthermore, the silicon pad 18 is positioned on the rest of the non-display area 25, and the black pattern 24 is installed to overlay with the black matrix 26. However, the protective sheet 10c is crumpled by pressure caused when the silicone pad 18 is attached on its one end. To this end, a crumple appears on the screen and the liquid crystal display device has a lower quality. The liquid crystal display device also is decreased in the manufacturing process. Since the protective sheet 10c must be fabricated larger than the liquid crystal panel, one end of the protective sheet 10c is installed adjacent to the lamp 20. To this end, the protective sheet 10c is crumpled by heat generated in the lamp and a crumple appears on the screen. As a result, the quality of the liquid crystal display device is reduced. Also, the liquid crystal display device has a lower manufacturing yield rate because of the difficulty in assembling of back-light unit.

SUMMARY OF THE INVENTION

Accordingly, it is an object of the present invention to provide a liquid crystal display device with a black film which is implemented in such a manner that a liquid crystal display device reduces bright lines, a light leakage and line cloak and a method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve this and other objects of the invention, a liquid crystal display device used with a light source according to one aspect of the present invention includes a first substrate; a second substrate having first and second surfaces, wherein the first surface is disposed against the first substrate; and a non-transparent film coated on periphery of the second surface of the second substrate to substantially block light emitted from the light source. The first substrate comprises first and second surfaces, the second surface being disposed against the first surface of the second substrate, wherein a non-transparent material is formed on periphery of the second surface of the first substrate. Preferably, the non-transparent material is a black matrix and the non-transparent film is a black film. The non-transparent film and the non-transparent material are partially overlapping throughout the periphery of the second substrate.

According to one aspect of the present invention, the liquid crystal display device further comprises a sheet material disposed between the light source and the second substrate. The sheet material includes a protective sheet, a prism sheet and a diffusion sheet.

A method of manufacturing a liquid crystal display device for use with a light source comprises providing a first substrate; providing a second substrate having first and second surfaces, wherein the first surface is disposed against the first substrate; and coating a non-transparent film on periphery of the second surface of the second substrate to substantially block light emitted from the light source. The non-transparent film is preferably a black film which is formed by any one of a printing process and a coating process.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings, in which:

FIGS. 2A and 2C are schematic plan views of the conventional liquid crystal display device;

FIG. 2B is a side elevation view of the liquid crystal display of FIG. 2A;

FIG. 3 is a schematic sectional view showing a structure of a liquid crystal display device according to a preferred embodiment of the present invention;

FIGS. 4A and 4C are schematic plan views of a liquid crystal panel according to an embodiment of the present invention; and FIG. 4B is a side elevation view of the liquid crystal display of FIG. 4A.

DETAILED DESCRIPTION OF THE PREFERRED EMBODIMENTS

Figure 1:
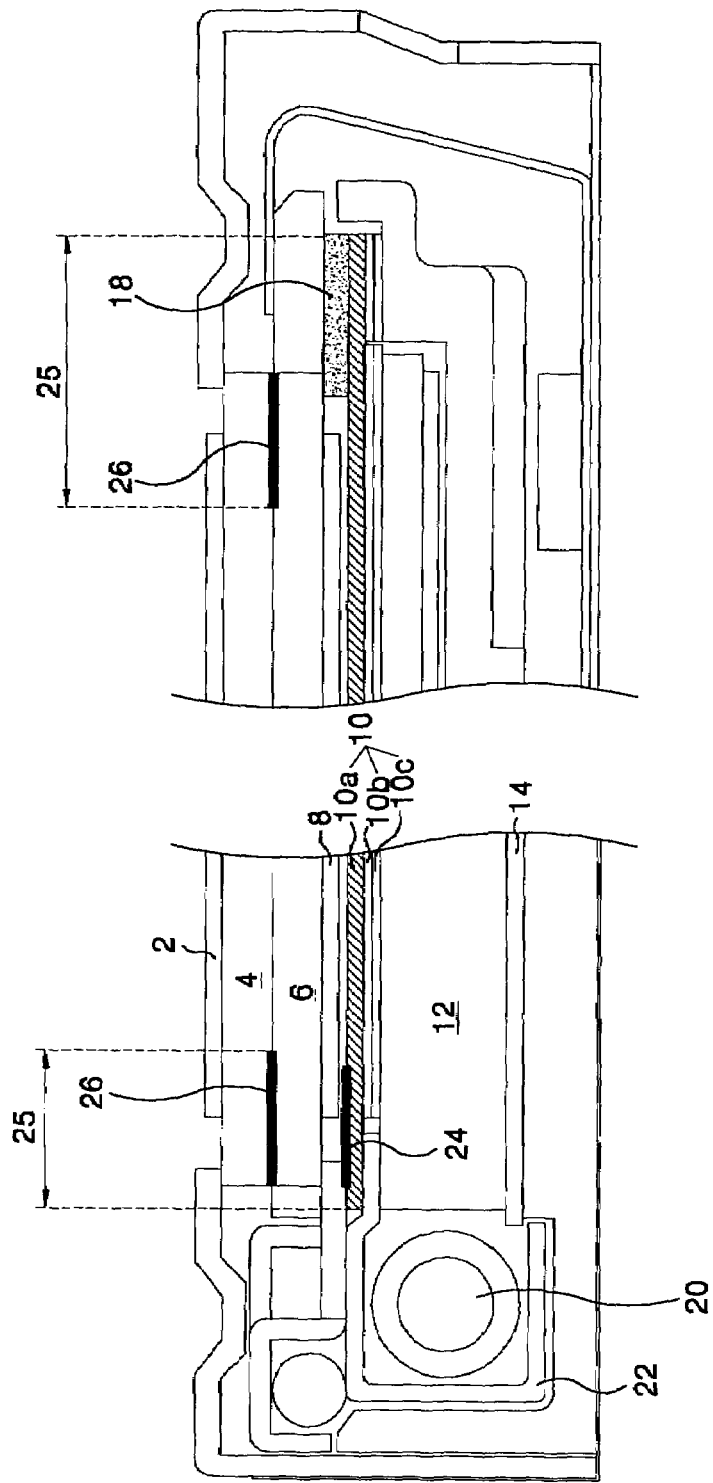
FIG. 1 is a schematic sectional view showing a structure of a conventional: liquid crystal display device.

Referring to FIG. 3, a liquid crystal display device according to a preferred embodiment of the present invention includes a black film 52, coated on the lower surface of a part of the non-display portion of the liquid crystal panel, for preventing bright lines, light leakage and line cloak. An upper polarizing sheet 32, an upper glass substrate 34, a lower glass substrate 36, a lower polarizing plate 38 and a back-light unit configuring to a liquid crystal display module have the same operations and functions as those shown in FIG. 1. Therefore, the descriptions regarding the upper polarizing sheet 32, upper glass substrate 34, lower glass substrate 36, lower polarizing plate 38 and back-light unit will be omitted.

The liquid crystal panel is divided into a display area 54 and a non-display area 56. The display area 54 constitutes an area in which the light beam from the back-light unit is transmitted to display a picture. The non-display area 56 constitutes an area covered by the black film 52 and the black matrix 46 so no picture or image is displayed. The black matrix 46 may be placed either on the lower substrate 36 or the upper substrate 34. In order to prevent bright lines, light leakage, line cloak and so on from affecting the display, black film 52 is formed by a printing and/or coating process on the non-display area 56 of the liquid crystal panel, i.e., on a part of the non-display area that the black matrix 46 does not cover, as shown in FIG. 3.

Referring to FIGS. 4A–4C, the display area 54 substantially transmits the light to display the picture. The picture is not displayed in the non-display area 56. The black matrix 46 is created on the part of the non-display area 56. In order to prevent bright lines, light leakage and line cloak, a protective sheet 40a is provided on the liquid crystal panel. In particular, the sheet material 40 is provided with a diffusion sheet 40c for diffusing the light guided by the back-light unit, a prism sheet 40b for concentrating the light diffused by the diffusion sheet 40c to each of the liquid crystal cells on the liquid crystal panel, and the protective sheet 40a for protecting the prism sheet 40b. These diffusion, prism and protective sheets 40a through 40c are sequentially disposed on the back-light unit to transmit the light from the back-light unit to the liquid crystal panel.

Since bright lines, light leakage and line cloak can be prevented by use of the black film 52, the liquid crystal display device with the black film 52 according to the present invention has a smaller protective sheet 40a. The protective sheet 40a has a size smaller than that used in the conventional liquid crystal display device and preferably equal to the prism sheet 40b. Accordingly, the protective sheet 40a can be installed in such a manner that one end is kept apart from the lamp 20. The silicone pad, which had been attached on the other end of the protective sheet, is no longer necessary and is also removed. Furthermore, a crumple does not appear on the screen as well as on the protective sheet 40a.

As a result, in the liquid crystal display device with the black film 52 according to the present invention, undesirable features, such as bright lines, light leakage and line cloak, are prevented. As a result, the picture quality can be greatly enhanced and its body can be lighter and slimmer. Also, in the method of fabricating the liquid crystal display device with the black film 52 according to the present invention, the manufacturing cost can be reduced by eliminating the use of the silicone pad. Additionally, due to the ease of the combination of the materials used in the back-light unit, the manufacturing rate of the liquid crystal display device can be also enhanced.

As described aboved, in the liquid crystal display device with the black film 52 according to the present invention, bright lines, light leakage and line cloak are prevented by using black film 52 so that the picture quality of the liquid crystal display device is greatly enhanced. The liquid crystal display device is lighter and slimmer by removing the silicone pad from the protective sheet.

In the method of fabricating the liquid crystal display device, a process is removed for attaching the silicone pad from the protective sheet such that the manufacturing cost can be reduced. Also, the manufacturing yield rate of the liquid crystal display device can be greatly enhanced because of the ease in the assembling of the back-light unit.

Although the present invention has been explained by the embodiments shown in the drawings described above, it should be understood to the ordinary person skilled in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device used with a light source, comprising:
   a first substrate;
   a second substrate having first and second surfaces, wherein the first surface is disposed against the first substrate;
   a non-transparent film coated on a periphery of the second surface of the second substrate to substantially block light emitted from the light source; and
   a sheet material disposed between the light source and the second substrate, wherein at least a portion of one edge of the sheet material adjacent to the light source is not directly under the non-transparent film.

2. The liquid crystal display device of claim 1, wherein the first substrate comprises first and second surfaces, the second surface being disposed against the first surface of the second substrate, wherein a non-transparent material is formed on a periphery of the second surface of the first substrate.

3. The liquid crystal display device of claim 2, wherein the non-transparent material is a black matrix.

4. The liquid crystal display device of claim 2, wherein the non-transparent film and the non-transparent material are partially overlapping throughout the periphery of the second substrate.

5. The liquid crystal display device of claim 4, wherein the non-transparent material is a black matrix.

6. The liquid crystal display device of claim 4, wherein the non-transparent film is a black film.

7. The liquid crystal display device of claim 1, wherein a non-transparent material is formed on a periphery of the second surface of the second substrate.

8. The liquid crystal display device of claim 1, wherein the non-transparent film is a black film.

9. The liquid crystal display device of claim 1, wherein the sheet material includes a protective sheet, a prism sheet, and a diffusion sheet.

10. The liquid crystal display device of claim 9, wherein the first substrate comprises first and second surfaces, the second surface of the first substrate being disposed against the first surface of the second substrate, wherein a non-transparent material is formed on a periphery of the second surface of the first substrate.

11. The liquid crystal display device of claim 10, wherein the non-transparent film and the non-transparent material are partially overlapping throughout the periphery of the second substrate.

12. The liquid crystal display device of claim 11, wherein the non-transparent material is a black matrix.

13. The liquid crystal display device of claim 11, wherein the non-transparent film is a black film.

14. The liquid crystal display device of claim 1, wherein the sheet material comprises an uppermost sub-layer having a first length and at least one underlying sub-layer arranged under the uppermost sub-layer and having a second length, wherein the first length is substantially equal to the second length.

15. The liquid crystal display device of claim 14, wherein one edge of the sheet material is adjacent to the light source.

16. A method of manufacturing a liquid crystal display device for use with a light source, comprising:
    providing a first substrate;
    providing a second substrate having first and second surfaces, wherein the first surface is disposed against the first substrate;
    coating a non-transparent film on a periphery of the second surface of the second substrate to substantially block light emitted from the light source; and
    disposing a sheet material between the light source and the second substrate, wherein at least a portion of one edge of the sheet material adjacent to the light source is not directly under the non-transparent film.

17. The method of claim 16, wherein the first substrate comprises first and second surfaces, the second surface of the first substrate being disposed against the first surface of the second substrate, wherein a non-transparent material is formed on a periphery of the second surface of the first substrate.

18. The method of claim 17, wherein the non-transparent film and the nontransparent material are partially overlapping, throughout the periphery of the second substrate.

19. The method of claim 18, wherein the non-transparent material is a black matrix.

20. The method of claim 18, wherein the non-transparent film is a black film.

21. The method of claim 16, wherein a non-transparent material is formed on a periphery of the first surface of the second substrate.

22. The method of claim 21, wherein the non-transparent material is a black matrix.

23. The method of claim 16, wherein the non-transparent film is a black film.

24. The method of claim 23, wherein the black film is formed by any one of a printing process and a coating process.

25. A liquid crystal display device used with a light source, comprising:
    a first substrate;
    a second substrate having first and second surfaces, wherein the first surface is disposed against the first substrate;
    a non-transparent film coated on a periphery of the second surface of the second substrate to substantially block light emitted from the light source; and
    a sheet material disposed between the light source and the second substrate, wherein the non-transparent film does not overlap at least a portion of one edge of the sheet material adjacent to the light source.

26. A method of manufacturing a liquid crystal display device for use with a light source, comprising:
    providing a first substrate;
    providing a second substrate having first and second surfaces, wherein the first surface is disposed against the first substrate;
    coating a non-transparent film on a periphery of the second surface of the second substrate to substantially block light emitted from the light source; and
    disposing a sheet material between the light source and the second substrate, wherein the non-transparent film does not overlap at least a portion of one edge of the sheet material adjacent to the light source.

* * * * *